INVENTOR.
PAUL E. SCHMIDT
BY Duane C. Bowen

April 24, 1962 P. E. SCHMIDT 3,031,008
PNEUMATIC-POWERED TORQUE-PRODUCING TOOL
Filed Jan. 26, 1959 2 Sheets-Sheet 2

INVENTOR.
PAUL E. SCHMIDT
BY Duane C. Bowen

United States Patent Office 3,031,008
Patented Apr. 24, 1962

3,031,008
PNEUMATIC-POWERED TORQUE-
PRODUCING TOOL
Paul E. Schmidt, Wichita, Kans., assignor to Boeing Airplane Company, Wichita, Kans., a corporation of Delaware
Filed Jan. 26, 1959, Ser. No. 789,153
16 Claims. (Cl. 153—82)

My invention relates to a pneumatic-powered torque-producing tool. The device is particularly adapted for the expansion of a tube by a roller mandrel and the tool has automatic, pneumatically-operated torque-limiting means acting to restrict the application of torque to a selected value in tube expanding and other applications.

In various applications of a torque-producing tool it is desirable to prevent torque from exceeding a given level because materials may fail in the work if excess torque is applied. The accuracy of the applied torque is particularly important in the aircraft industry where the utmost is required of materials in order to meet strength and other requirements while closely limiting weight. One use of the tool disclosed herein is to expand thin-walled aluminum tubing into flanged couplings by the application of torque through an interior roller mandrel and it is desirable to have tolerances of ±3% of torque values such as 100 ft.-lbs.

The objects of my invention include, therefore: to devise a pneumatic-powered torque-producing tool in which torque will not exceed a preset value; to provide such a tool of increased accuracy in its torque limiting function and, more specifically, to control torque to within about 3% or less of the selected limit; to provide an adaptable, economical, hand-held tool which incorporates a standard pneumatic motor; to devise a versatile and rapidly responding control system for such a tool that will shut off the motor when the torque limit is reached or, in the alternative, will continue rotation of the output shaft but will limit the application of torque or perform some other function by a device external of the motor; to provide a control system for tube expansion that terminates roller expansion within the tube when the selected torque is reached but continues rotation of the roller mandrel so that the rollers will mill the tube interior to a constant diameter; and to devise a torque-producing tool particularly adapted for rolling thin-walled tubes into the interior of couplings and the like and will meet tolerances in the order of 3% of the maximum torque selected.

My invention will be best understood, together with additional objectives and advantages thereof, from the following description, read with reference to the drawings, in which.

Figure 2:
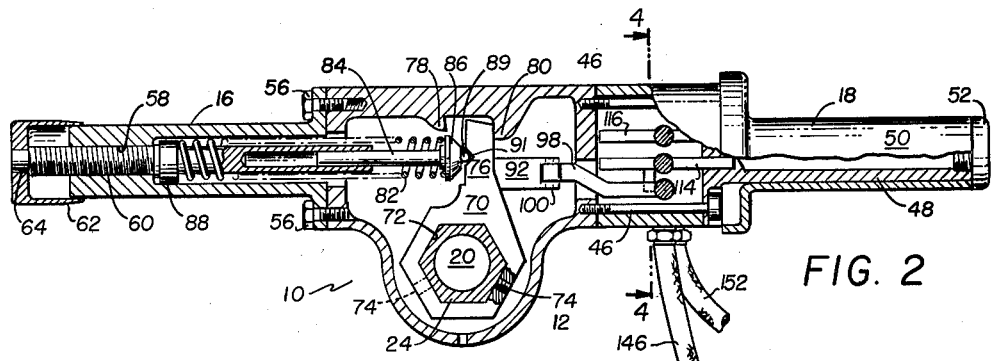
FIGURE 2 is an end view taken principally in section on line 2—2 of FIGURE 1.

The structure will be described in the following order: (1) the motor and housing, (2) the torque sensing means, (3) the valve assembly, and (4) the clutching means for preventing increases in application of torque.

Briefly, the mechanism includes a motor mounted for limited pivotal movement in the housing, an arm attached to the housing, an adjustable spring device for resisting movement of the arm responsive to torque, and a link attached to the arm and moving therewith when the torque exceeds the strength of the spring means. The end of the link abuts an end of a valve spool and prevents closing of the valve until the end is moved out of abutment when the arm overcomes the spring. When the valve spool moves to closed position, the valve movement results in a change in pneumatic pressure applied to clutching means on the output shaft of the motor. The clutch means controls the expansion of roller means in a roller mandrel expanding a tube into a coupling. The mandrel is permitted to continue rotation to mill the interior of the tube to a uniform diameter after termination of the expansion of the rollers whereby a condition is avoided in which the rollers would leave metal built up in front of them if the mandrel rotation was ceased when the selected torque was reached.

Motor and Housing

The torque-producing device 10 includes a main housing 12, a valve housing 14 and handles 16, 18. A standard commercial pneumatic motor, sometimes referred to as a pneumatic drill motor, of the type available from various sources may be used and the motor shown in the drawings is of typical construction. The motor 20 includes an output shaft 22, gear reduction sections 24 which are of hexagonal configuration, a driving portion 26 and end members 28, 30. The motor 20 is pivotally mounted in main housing 12 by antifriction thrust bearings 32, 34 between motor end pieces 28, 30 and seats 36, 38 in housing 12. Cap members 40, 42 secured by bolts 44 retain bearings 32, 34 in place.

Valve housing 14 is secured to main housing 12 by bolts 46 and a tubular extension 48 formed integral with housing 14 forms a bearing in handle 18. A rotatable sleeve 50 is mounted on bearing extension 48 and is retained in place by a plug 52 threaded into the end of extension 48. Handle sleeve 50 is rotatably mounted and, as hereinafter described, moves the valve control levers between stop, forward and reverse as it is rotated.

Handle 16 is fastened to main housing 12 by bolts 56. The handle has a threaded bore 58 receiving a threaded rod 60. A knob 62 is secured to the end of rod 60 by means of a reduced-diameter end 64 on rod 60 press-fitted into an opening in knob 62. Rotation of knob 62 results in adjustment of the position of rod 60 in an axial direction for adjusting spring means hereinafter described. It will be noted that indicia 66 on the handle and knob provide a scale of values of spring compression that may be calibrated in terms of the desired torque limits for torque-producing device 10.

Torque Sensing Means

An arm 70 having a hexagonal opening 72 is positioned on one of the gear reduction sections 24 of motor 20 and is secured in place by set screws 74. Motor 20 being pivotally mounted, the end 76 of arm 70 is movable between abutments 78, 80 formed in the interior of main housing member 12.

When motor 20 is driven to produce torque on the work, referred to as the forward direction of the motor, spring 82 acts to resist the tendency of the motor to rotate oppositely to output shaft 22 with a force adjustable by knob 62. Spring 82 encircles the inner end of rod 60 and a pressure applying rod 84 telescoping in the end of rod 60. Foot portion 86 on the end of rod 84 and a collar portion 88 on rod 60 form abutments for spring 82. Foot 86 has a cylindrical end piece 89 acting in a seat 91 in end 76 of arm 70. In this manner, arm 70 will not pivot until the torque developed in output shaft 22 reaches a value equal to the resistance of spring 82 to such pivoting. The resistance of the spring is calibrated on indicia 66 on handle 16. Knob 62 is adjusted until the selected torque limitation appears on the scale 66.

Linkage means is attached to the end 76 of arm 70 by a pin 90 and includes a first link member 92 having an axially elongated slot 94 receiving pin 90. Slot 94 provides a telescoping connection between link member 92 and arm 70 and a spring 96 seated between pin 90 and the end of a bore in link 92 resiliently resists telescoping of these parts for a purpose described hereinafter. A second link member 98 is secured to first link member 92 by a pivotal connection at 100. When arm 70 overcomes spring 82 and pivots, this motion is directly reproduced in movement of the outer end of link member 98.

Link 98 being in an opposite position on arm 70 to spring 82, the movement of link 98 becomes a direct function of the action of spring 82. The two members act at a point spaced from the axis of torque application and hence the accuracy of limitation of torque depends partly on the accuracy of the resilient characteristic of spring 82 in repeated cycles. Springs are relatively accurate devices both as to single readings and as to the uniformity of successive actions and, within the tolerances here required, are capable of performing satisfactorily if inaccuracies of associated mechanisms are minimized. Other structures shown having an effect on accuracy include the mechanical advantage of arm 70, the gear reduction and some other mechanisms.

The opposition of the spring to the control link 98 and the positioning of the spring to act in the same direction as the torque to be measured, e.g., substantially tangentially to the motor, are important factors in obtaining accuracy with this device. My invention was made to obtain a torque-producing device which would qualify under ±3% tolerances of torque values such as 100 ft.-lbs. and which would perform some other functions, no device found on the market being able to meet the exacting requirements. Parts with high friction values in the torque control system would impair accuracy, such as high friction camming surfaces subjected to heavy loads. Inaccuracies would result if the spring were not disposed substantially tangential to the motor shaft axis or suffered a greater mechanical disadvtantage, and if a longer or higher friction series of mechanical elements were interposed between application and measurement of torque.

For purposes of use of the term in the claims, the word spring is defined as a member formed from spring stock, such as a coil spring, having as its sole function that of a spring, as distinguished from a resilient member having additional function or functions, as, for example, the fluid supply tube in U.S. Patent 2,740,507 which is resilient but has the other functions of fluid supply and motor support.

Valve Assembly

A valve housing block 102 is provided in valve housing 14 and provides chambers for a forward valve spool 104, a reverse valve spool 106 and a release valve spool 108. Seals will be provided in a conventional manner in the valve system and have not been shown to simplify the drawings. The valve spools are biased toward a closed upper position as viewed in FIGURE 4 by compression springs 110 acting between the ends of the spools and screws 112 set in threaded openings through valve housing 14.

Figure 3:
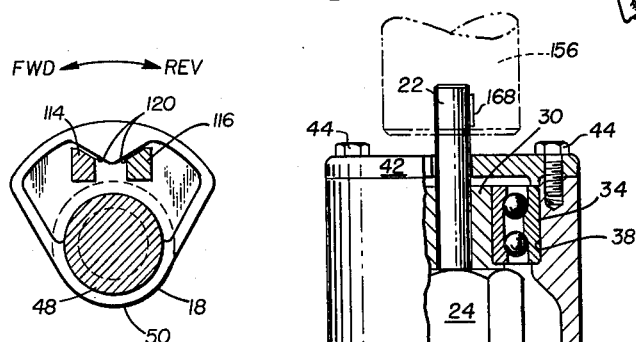
FIGURE 3 is a sectional view taken on line 3—3 of FIGURE 1.
Figure 1:
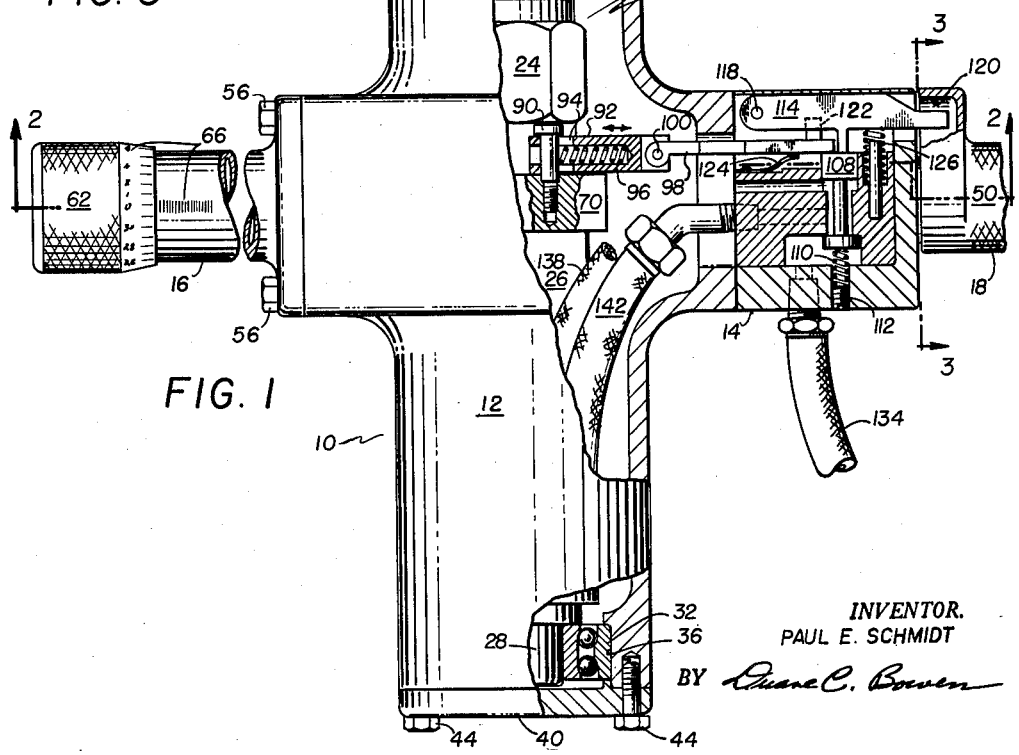
FIGURE 1 is a plan view of a specific embodiment of my torque-producing tool, portions being broken away to show interior construction and only part of the handles being shown.

A forward lever 114 and a reverse lever 116 are pivotally connected at one end to a pin 118 and the other ends extend to within the end of handle control sleeve 50. The inner end of sleeve 50 is enlarged and has an interior camming surface 120 that acts on the ends of levers 114 and 116. As viewed in FIGURE 3, movement clockwise depresses reverse lever 116, movement counterclockwise depresses forward control lever 114, and the intermediate position shuts off the tool. Lever 114 has a lateral arm 122 extending to the top of link 98 which is pressed to abutting position by spring 124. Compression spring means 126 acts to press lever 114 to its upper position as viewed and a like compression spring, not shown, acts to press reverse lever 116 to its upper position.

The spool chambers have upper exhaust ports 128 exhausting to the interior of housing 12 and the lower ends of the chambers communicate to a common chamber 130 which connects through port 132 to a pneumatic supply line 134. Reverse spool 106 has a medial port 136 communicating through line 138 to motor section 26 to power motor 20 in a reverse direction when spool 106 is in the open, lower position communicating pressure from line 134 through common chamber 130 and out through port 136. The reverse spool exhausts air from motor 20 when in a closed, upper position as shown in FIGURE 4 in which air from the motor passes through line 138, through medial port 136 and through exhaust port 128 to the interior of housing 12.

Figure 4:
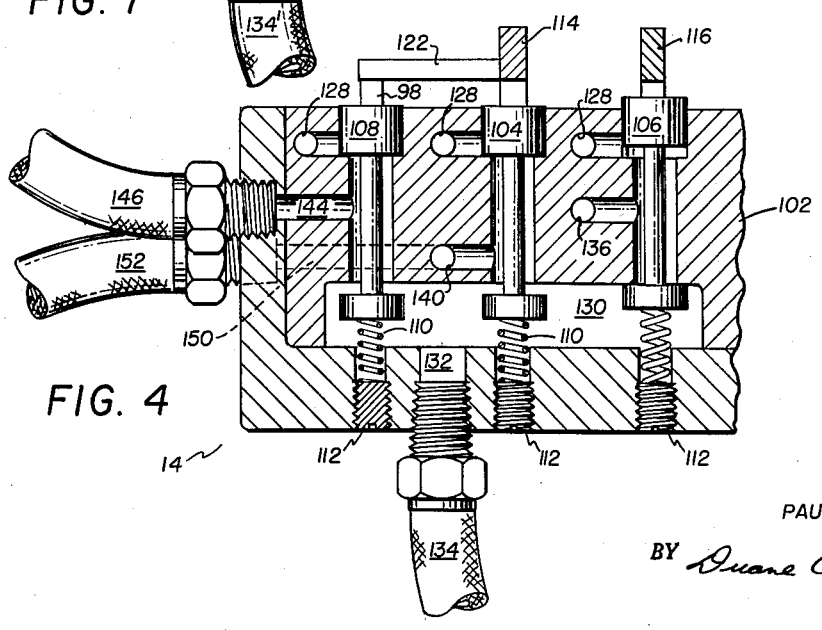
FIGURE 4 is an enlarged fragmentary view taken principally in section on line 4—4 of FIGURE 2.

Forward spool 104 when in the open, lower position shown in FIGURE 4 applies pressure from supply line 134 through common chamber 130 and through port 140 to line 142 to motor section 26 to power motor 20 in a forward direction. Lines 138 and 142 to motor 20 are flexible so as to permit limited pivoting of motor 20. When forward spool 104 is in a closed, upper position and reverse spool 106 is depressed, exhaust air passes from the motor through line 142, through port 140 and out exhaust port 128 to the interior of housing 12.

Release spool 108 is pressed to its open, lower position as viewed in FIGURE 4 when forward spool 104 is depressed, lateral arm 122 of forward lever 114 bearing on the top of link 98 and thereby depressing the valve. The release spool then applies pressure from supply line 134, through common chamber 130 and out medial port 144 through the line 146 to a clutch device 148 shown in FIGURES 5 and 6. The medial port 140 of forward spool 104 also has a passageway 150 connecting through line 152 to clutch 148.

The purpose of the application of pressure through lines 146 and 152 will be described in more detail later but, briefly, when link 98 moves with arm 70, responsive to torque overcoming spring 82, until it passes beyond the upper end of release spool 108, the spool moves to a closed, upper position. The closed position of release spool 108 terminates application of pressure through medial port 144 to line 146 and this line is exhausted to the interior of housing 12 through exhaust port 128. The difference in pressure then supplied through lines 152 and 146 actuates clutch 148 and the application of torque is terminated while motor 20 continues to rotate output shaft 22.

Once the end of control link 98 passes beyond the end of release spool 108, the spool moves to closed position and will remain in that position as long as forward lever 114 is depressed. If torque remains at the same level, link 98 will remain beyond the end of the valve. In this position it is still under lateral arm 122 on forward lever 114. The squared end of link 98 will abut the end of spool 108 and will not return to its original position even if torque is reduced. In this case, the pressure of spring 82 tending to move arm 70 to its original position is accommodated by slot 94 in link 92 permitting pin 90 to move to the other end thereof against spring 96, Link 98 returns to its original position over release spool 108 as viewed under the urging of spring 96 when handle sleeve 50 is moved to neutral or reverse position, forward control lever 114 moves up by the action of spring 126, and spring 124 biases link 98 up into the space vacated by lateral arm 122 of forward lever 114 at a level above the end of release spool 108.

Clutching Mechanism

The clutching means 148 connects through coupling 156 to output shaft 22. The clutching device has a shaft 158 with a squared end retained in coupling 156 by balls 160 pressed into an end groove 162 in shaft 158 by a spring-pressed sleeve 164 having a camming surface 166 acting on balls 160. Output shaft 22 is secured to coupling 156 by a key 168 and a retainer set screw 170.

Shaft 158 extends to within tube T to be expanded into the flanged coupling C and the shaft is tapered in this area. Roller mandrel 172 is of typical construction on the market for expanding tubes. Briefly, mandrel 172 includes a housing 174 rotatably supporting a series of radially expandable rollers 176 that are set at a small angle so as to tend to climb the tapered end of shaft 158 during the expanding operation and thereby to move radially outwardly and expand tube T. An annular abutment member 178 is retained in place by a screw 180 received in an annular groove 182 in housing 174 and annular member 178 acts as an abutment to coupling C. Annulus 178 is backed up by an antifriction thrust bearing 184. Clutching mechanism 148 has an annular retainer ring 186 secured to mandrel housing 174 by set screws 188 to rotate therewith and secured to the clutch body 190 by an antifriction thrust bearing 192.

Shaft 158 is free to rotate at all times and normally advances into tube T by the action of rollers 176 acting to climb the taper on the shaft. Means are provided to terminate the advancement of shaft 158 into tube T and relative housing 190 which includes a plurality of clutch plates 194 having aligned circular openings 196 therein and pivotally secured to housing 190 by a screw 198. Plates 194 act to clutch a sleeve 200 by pivoting or by resilient distortion when they are moved from other than a right angular position relative to sleeve 200 thereby locking the sleeve in the manner common to such friction clutches. Plates 194 are normally pressed to the right angular position by a plunger 202 biased by a compression spring 204.

Shaft 158 has a collar portion 206. An antifriction abutment between sleeve 200 and collar portion 206 of shaft 158 is provided by a ball thrust bearing 208, an annular retainer ring 210 and an end piece 212 secured by set screws 214. When clutch plates 194 secure sleeve 200 against advancement relative to tube T, shaft 158 likewise is prevented from advancing and the tendency of rollers 176 to climb the tapered portion of the shaft is resisted. When this occurs, shaft 158 continues rotation but rollers 176 can no longer expand and merely rotate within tube T thereby milling and smoothing the interior surface. This continued rotation upon the development of maximum torque prevents the leaving of tube material built up in front of rollers 176 which would occur if rotation stopped when the selected maximum torque was reached.

Figure 5:
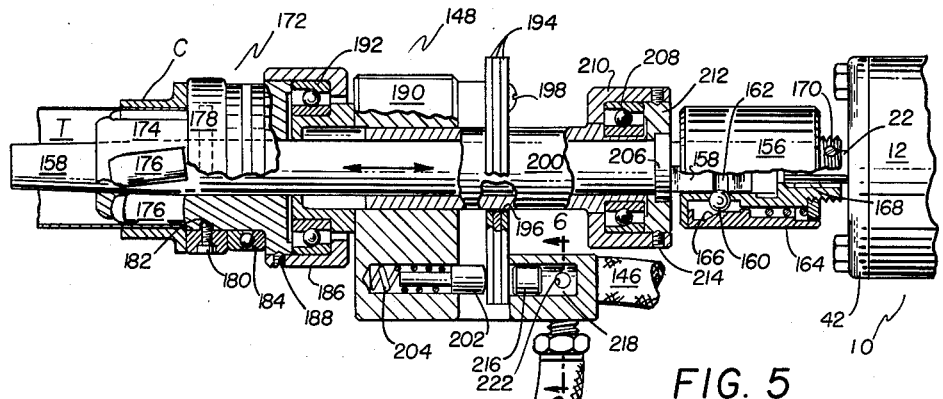
FIGURE 5 is a side view, partly in section, of an attachment, including a roller expansion mandrel, which connects to the output shaft of the motor shown in FIGURE 1.
Figures 6, 7:
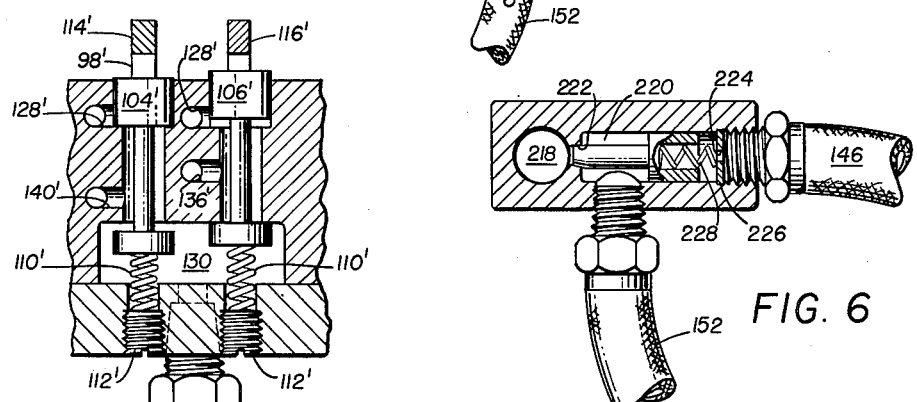
FIGURE 6 is an enlarged view, principally in section, taken on line 6—6 of FIGURE 5.
FIGURE 7 is a view similar to FIGURE 4 of a modified two-spool valve system.

Plates 194 are pressed for their clutching action by a piston 216 moved thereagainst by air pressure entering the chamber 218 which houses piston 216. As shown in FIGURES 5 and 6, a valve 220 normally seals an opening 222 between line 152 and chamber 218 as long as pressure is also applied through line 146. The pressure in line 146 acts against the rear end of valve 220 through an aperture 224 in a washer 226. A compression spring 228 between washer 226 and valve 220 tends to bias the valve into seated position when not overcome by air pressure.

With the same air pressure applied on lines 146 and 152, valve 220 is held in closed position because of the larger effective area thereof against which the air from line 146 acts. However, when pressure to line 146 is cut off by movement of relief valve 108 into the closed, upper position exhausting port 144 to exhaust port 128, air pressure on line 152 from medial port 150 of forward spool 104 moves valve 220 to a back position and air enters chamber 218 and presses piston 216 to lock plates 194 on sleeve 200. When this happens, torque applied to tube T will not increase beyond the level at time of operation of release spool 108.

Operation

The operation of the torquing device has been explained above in connection with the description of the detailed parts but the general operation will be reviewed below. The tube T with the coupling C or other body into which tube T is to be expanded is inserted over roller mandrel 172. When motor 20 is activated by rotation of control sleeve 50 to the forward position, thereby depressing forward lever 114 and opening forward and release valves 104, 108, output shaft 22 and shaft 158 connected thereto rotate. Rollers 176 tend to climb the tapered end of shaft 158 and thereby gradually apply increasing torque while milling the interior of tube T into ever increasing diameters. Link 98 is in position over release spool 108 in the beginning operation. Air pressure is applied through forward spool 104 to motor 20 and air pressure is applied through lines 146 and 152 from release and forward spools 108, 104, respectively. Shaft 158 and sleeve 200 are permitted to move to the left as viewed in FIGURE 5.

Torque is increased as rollers 176 expand tube T into coupling C. When a torque level is reached that is preselected as the desirable limit of expansion and is set into spring 82 by adjustment of control knob 62, arm 70 on motor 20 overcomes spring 82 and pivots, moving link 98 from the upper end of release spool 108 whereby the spool moves to closed position. At this point pressure on line 146 is relieved through medial port 144 and exhaust port 128 and the pressure applied through line 152 opens valve 220 (FIGURE 6), enters chamber 218 and moves piston 216 against clutching plates 194. When this occurs sleeve 200 and shaft 158 are locked by the plates against further advancement. Shafts 22 and 158 continue to rotate and roller mandrel 172 moves therewith and continues to mill the interior of tube T without further expansion or resulting torque.

When the operation is completed, control sleeve 50 is rotated in the reverse direction (FIGURE 3) opening reverse spool 106 and closing forward spool 104. The change in the spool positions applies pressure to motor section 26 in a reverse direction, shafts 22 and 158 are rotated in an opposite direction, and rollers 176 move down the tapered end of shaft 158 thereby releasing tube T from roller mandrel 172. Pressure is relieved from both lines 152 and 146 through medial ports 150, 144 of forward and release spools 104, 108, and valve 220 is moved to its normal closed position by spring 228. Torque is relieved on arm 70 and spring 82 is free to move arm 70 back to its beginning operating position. Link 98 is moved with arm 70 back to a position over spool 108. At this point the parts are ready to begin another expansion operation.

Adjustments in the torque limit are effected through selection of a torque limit on calibrated scale 66 by means of knob 62. The calibration of indicia 66 is accomplished experimentally with a device for measuring the torque of shaft 22 in the various settings.

In operation, when a selected torque is reached, metal within tube T will be built up in front of rollers 176 and, if rotation of mandrel 172 were terminated at this point, the tube interior would be left with ridges at the locations where rollers 176 stopped. By use of the clutching means 148 and the provision of the release spool 108, torque is not permitted to increase, as rollers 176 can no longer advance up the taper of shaft 158, but rotation is continued thereby milling the material in front of the rollers until tube T has a uniform interior diameter.

While the clutching system is desirable in this operation, it can be omitted in some applications of the tool and the torque limiting function can be accomplished by the valve structures shown in FIGURE 7. The structure of FIGURE 7 and its relationship to the rest of the torque and limiting mechanisms are similar to that shown in the other drawings, particularly FIGURE 5. The valve spool system is similar to that shown in FIGURE 5 with the exception of the elimination of release spool 108. For this reason, the following description will be brief and similar reference numerals will be used.

The clutching mechanism is eliminated with the use of the FIGURE 7 valve system and no equivalent is provided for the FIGURE 5 medial relief ports 144 and 150 or the auxiliary lines 146 and 152. Forward control lever 114' does not have a lateral arm and control link 98' is interposed between lever 114' and the top of forward spool 104'. The forward spool has an exhaust port 128' to the motor housing and a medial port 140' to the motor to power the same in the forward direction.

Air is supplied to a common supply chamber 130' through pneumatic supply line 134'. Spools 104' and 106' are set in chambers in a valve housing 102' and are biased to a closed, upper position by springs 110' acting between the lower ends of the spools and screws 112'. Reverse spool 106' is like that shown in FIGURE 5 and has associated therewith rearward control lever 116', exhaust port 128', and medial port 136' to power the motor in a rearward direction.

When forward spool 104' is depressed by forward lever 114' acting on top of control link 98', the motor operates until the maximum torque is reached and then bar 98' is pulled by the motor torque arm out of abutment with forward spool 104' and the spool moves to its upper, closed position. At this point, supply of air to medial port 140' is terminated and the motor stops. Link 98' is permitted to return to a position in abutment with spool 104' when the control levers are moved to a neutral or reverse position.

It will be seen from the above how the objectives have been met and that a versatile and sensitive tool has been provided. A torque-producing device constructed according to the description and drawings herein has been tested and the plus and minus range of readings was within a total of 3% of the selected torque thereby being substantially better than the ±3% or total of 6% deviation which was an objective of this development.

Having thus specifically described my invention, I do not wish to be understood as limiting myself to the precise details of construction shown, but instead wish to cover those modifications thereof that will occur to those skilled in the art from my disclosure and that fairly fall within the scope of my invention, as described in the following claims.

I claim:

1. A portable, hand-held torque-producing device, comprising: a portable housing of a size to be hand held; a standard pneumatic drill motor, having a casing and an output shaft journaled therein, said motor being mounted in said housing by rotary mounting means permitting at least limited pivotal movement therebetween; a pneumatic line to said motor for application of pressure from a pneumatic supply source and valve means connected to said pressure line operative to control application of motor torque to work and including a torque relief valve secured to said housing having a torque relief valve spool movable between an on and an off position and means biasing said valve toward said off position; said motor having an arm secured to said casing extending therefrom in a direction lateral of said shaft and operating means including motion transfer means acting between said relief valve spool and said arm at a location spaced from the axis of said shaft normally holding said valve in on position and permitting said relief valve spool to move from said on position to said off position responsive to pivoting of said motor a selected distance as said motor tends to pivot oppositely to said shaft as work is subjected to torque and a coil spring acting between said motor and said housing operative to resist such pivoting of said motor whereby said relief valve is operated when said spring is overcome.

2. A torque-producing device, comprising: a housing; a fluid motor, having an output shaft to apply torque to work, mounted in said housing by rotary mounting means permitting at least limited pivotal movement therebetween; a fluid line to said motor for application of pressure from a fluid supply source and shut-off valve means interposed in said fluid line having a valve spool movable between an open operating position and a closed position in which torque is no longer applied to such work and means normally biasing said spool toward said closed position; motion transfer means including a bar connected to said motor at a point radially spaced from the axis of said shaft and in normal position before maximum torque is developed having an end abutting said spool preventing movement of said spool from said open operating position to said closed position, said end of said bar moving out of abutment with said spool permitting said spool to move from said operating position to said closed position shutting off supply of fluid pressure to said motor responsive to pivoting of said motor moving said point about said axis a selected distance as said motor tends to pivot oppositely to said shaft as such work is subjected to torque and a spring acting between said motor and said housing operative to resist such pivoting of said motor whereby said spool is released by said bar when said spring is overcome.

3. A torque-producing device, comprising: a fluid motor, having an output shaft and support means for said motor including pivotal mounting means; a fluid line to said motor and torque relief valve means connected to said line and supported by said support means having a valve spool movable between an on position and an off position and means biasing said spool toward said off position; motion transfer means including a bar connected to said motor and in position before maximum torque is developed having an end abutting the end of said spool preventing movement of said spool to said off position, said bar moving out of abutment permitting said spool to move to said off position responsive to pivoting of said motor a selected distance as work is subjected to torque and adjustable spring means operative to resist such pivoting of said motor, a tube expansion roller mandrel having a tapered shaft and a housing rotating with said tapered shaft and supporting a plurality of rollers engaged with said tapered shaft, said tapered shaft being connected to said output shaft to rotate therewith, a sleeve mounted on said tapered shaft and means therebetween preventing axial advancement of said tapered shaft relative to said sleeve, a braking plate on said sleeve and a fluid piston connected to said torque relief valve means and operative to move said braking plate to locking position on said sleeve when said spool moves to said off position, said braking plate in locking position preventing relative axial movement between said housing and said sleeve whereby when said spool moves to off position said rollers are restrained from climbing the taper on said tapered shaft preventing further increase in torque while said shafts continue to rotate.

4. A torque-producing device, comprising: a housing; a fluid motor, having an output shaft to apply torque to work, mounted in said housing by rotary mounting means permitting at least limited pivotal movement therebetween; a fluid line to said motor for application of pressure from a fluid supply source and valve means connected to said fluid line including torque relief valve means secured to said housing having a relief valve spool movable between an open operating position and a closed relief position in which torque is no longer applied to such work and means normally biasing said spool toward said relief position; motion transfer means including a bar connected to said motor at a point radially spaced from the axis of said shaft and in normal position before maximum torque is developed having an end abutting the end of said spool preventing movement of said spool from said open operating position to said closed relief position, said end of said bar moving out of abutment with said spool permitting said spool to move from said operating position to said relief position responsive to pivoting of said motor moving said point about said axis a selected distance as said motor tends to pivot oppositely to said shaft as such work is subjected to torque and a spring acting between said motor and said housing operative to resist such pivoting of said motor whereby said spool is released by said bar when said spring is overcome.

5. The subject matter of claim 4 in which said valve means includes a forward valve interposed in said line between such source and said motor, said forward valve including a forward spool and a forward lever operable to move said forward spool to an open position applying pressure to said motor, said lever having a portion abutting said bar oppositely to said relief spool whereby said relief spool is moved to said open position at the same time as said forward spool when said forward lever is operated pressing said bar against said relief spool.

6. A torque-producing device, comprising: a fluid motor, having an output shaft to apply torque to work, and support means for said motor including rotary mounting means permitting limited pivotal movement between said motor and said support means; torque relief means supported by said support means having a control element having an operating position and a relief position in which torque is no longer applied to such work; said motor having an arm extending laterally therefrom and motion transfer means connected to said control element and to said arm at a location radially spaced from the axis of said shaft and extending laterally from said arm operative to move said control element from said operating position to said relief position responsive to pivoting of said motor a selected distance as said motor tends to pivot oppositely to said shaft as such work is subjected to torque and an adjustable compression spring acting between said support means and said arm on the opposite side from said motion transfer means operative to resist such pivoting of said motor whereby said control element is moved to said relief position when said spring is overcome.

7. A torque-producing device, comprising: a fluid motor and support means including rotary mounting means supporting said motor and permitting at least limited pivotal movement therebetween, said motor having an output shaft, a fluid pressure line to said motor and valve means connected to said pressure line supported by said support means including a forward operating valve and a torque relief valve, manually operable means operable to open and close said operating valve, operating means including motion transfer means between said relief valve and said motor at a point radially spaced from the axis of said shaft operative to move said relief valve from open to closed position as said motor pivots moving said point about said axis a selected distance responsive to torque and an adjustable spring acting between said motor and said support means operative to resist such pivoting of said motor, a tool attached to said output shaft external of said motor and said support means and a relief line extending from said relief valve to said tool external of said motor and said support means and said tool having fluid control means preventing increases in application of torque to the work, while said output shaft continues to rotate and to apply power to said tool external of said motor and said support means, responsive to a change in fluid pressure in said relief line when said relief valve moves to said closed position.

8. A pneumatic-powered torque-producing device, comprising: a pneumatic motor having a rotary output shaft and support means for said motor including rotary mounting means permitting limited pivotal torque movement of said motor relative to said support means, a pneumatic suply line to said motor, a shut-off valve interposed in said line and supported by said support means, operating means including linkage means connected to said valve and connected to said motor at a point radially spaced from the axis of said shaft and extending substantially tangentially relative to said shaft axis operative by said torque movement of said motor moving said point about said axis to close said valve, a torque resisting coil spring fixed to said support means and acting substantially tangentially relative to said shaft axis in opposition to said linkage means operative to prevent closing of said valve until the resistance of said torque resisting spring is overcome.

9. A torque-producing device, comprising: a motor and support means including rotary mounting means supporting said motor and permitting at least limited pivotal movement therebetween, said motor having an output shaft, torque relief means supported by said support means and motion transfer means connected to said torque relief means and connected to said motor at a point radially spaced from the axis of said shaft operative to move said torque relief means from a first operating position to a second torque relief position as said motor pivots a selected distance responsive to torque moving said point about said axis and an adjustable spring acting between said motor and said support means operative to resist such pivoting of said motor, a tool attached to said output shaft and said tool having control means connected to said torque relief means and operative responsive to movement of said torque relief means from said first position to said torque relief position to prevent increase in application of torque to said work while said output shaft continues to rotate and to apply power to said tool external of said motor and said support means.

10. The subject matter of claim 9 in which said tool includes a tube expansion roller mandrel having a tapered shaft and a plurality of rollers engaged with said tapered shaft and tending to climb the taper as said tapered shaft rotates and thereby to expand into a tube or the like, said tapered shaft being connected to said output shaft to rotate therewith, said control means acting to prevent said rollers from climbing farther up the taper of said tapered shaft when operated responsive to movement of said torque relief means to said torque relief position whereby said shafts continue to rotate and further increase in torque is prevented as said rollers are restrained from further expansion.

11. In a tube expansion device having a roller mandrel having a housing supporting a plurality of radially expandable rollers and a shaft having a tapered portion engaging said rollers which tend to climb a tapered portion when said shaft is rotated, the improvement, comprising: a sleeve mounted on said shaft and engaging means therebetween preventing axial advancement of said shaft in said sleeve, said housing being rotatable with said shaft and relative to said sleeve, a braking plate on said sleeve, a torque-producing motor connected to said shaft to rotate the same, operating means operative to move said braking plate to a locking position on said sleeve, torque sensing means on said motor connected to said operating means and initiating operation of said operating means when a selected torque is developed in said motor, and said braking plate when locked to said sleeve preventing axial advancement of said housing relative to said sleeve whereby when the selected torque is developed in said motor said housing is restrained from movement relative to said tapered shaft and said rollers are prevented from climbing said tapered shaft portion and said mandrel continues to rotate while increases in torque due to expansion of said rollers is prevented.

12. The subject matter of claim 11 in which said operating means is a fluid piston to apply pressure to said braking plate when operated and said torque sensing means is connected to said piston by a fluid line, said torque sensing means when said selected torque is reached applying fluid pressure to said piston through said line thereby operating said piston.

13. In a tube expansion device having a roller mandrel having a housing supporting a plurality of radially expandable canted rollers and a shaft having a tapered portion engaging said rollers that tend to climb the tapered portion when said shaft is rotated, the improvement, comprising: a torque-producing motor connected to said shaft to rotate the same, torque sensing means on said motor operating when a selected torque is developed in said motor, braking means operable to prevent further advancement of said shaft into said housing while permitting said shaft and mandrel to continue rotation, and operating means connected to said torque sensing means and to said braking means operating said braking means when said selected torque is developed, whereby further expansion of said rollers is prevented when said selected torque is reached and whereby said mandrel continues to rotate thereby milling material of such tube built up ahead of said rollers when said selected maximum torque is reached.

14. A fluid-powered torque-producing device, comprising: a fluid motor having a rotary output shaft and support means for said motor including rotary mounting means permitting at least limited rotary torque movement of said motor relative to said support means, a fluid supply line to said motor, a shut-off valve interposed in said line, operating means acting on said valve including means extending between said support means and said motor at a point radially spaced from the axis of said shaft operative by said rotary torque movement of said motor in said support means moving said point about said axis and moving said point relative to said support means to close said valve, a torque resisting spring acting between said motor and said support means and acting in opposition to said operating means and operative to prevent closing of said valve until the resistance of said torque resisting spring is overcome by rotation of said motor relative to said support means.

15. A torque-producing device, comprising: a fluid motor, having an output shaft to apply torque to work, and support means for said motor including rotary mounting means permitting at least limited rotary movement between said motor and said support means; torque relief means having a control element having an operating position and a relief position in which torque is no longer applied to such work; motion transfer means acting on said control element and extending between said support means and said motor at a point radially spaced from the axis of said shaft operative to move said control element from said operating position to said relief position responsive to rotation of said motor in said support means moving said point about said axis and moving said point relative to said support means a selected distance as said motor tends to rotate oppositely to said shaft as such work is subjected to torque and a spring acting between said motor and said support means operative to resist such rotation of said motor whereby said control element is moved to said relief position when said spring is overcome by rotation of said motor relative to said support means.

16. The subject matter of claim 15 in which there are manually controllable means for adjusting the resiliency of said spring during use of said device.

References Cited in the file of this patent

UNITED STATES PATENTS

| 2,389,098 | Welch | Nov. 13, 1945 |
| 2,548,339 | Berry | Apr. 10, 1951 |
| 2,690,205 | Stary | Sept. 28, 1954 |
| 2,740,507 | Shaff | Apr. 3, 1956 |

FOREIGN PATENTS

| 749,639 | Germany | Nov. 28, 1944 |